3,244,374
WATER AND GAS-CONTROL FOR WATER REACTION MOTOR
Gustav Adolf Welge, Rankestrasse 24, Berlin, Germany, and Hermann Saurer, Wallrafplatz 1, Cologne (Rhine), Germany
Filed July 9, 1962, Ser. No. 208,333
2 Claims. (Cl. 239—265.17)

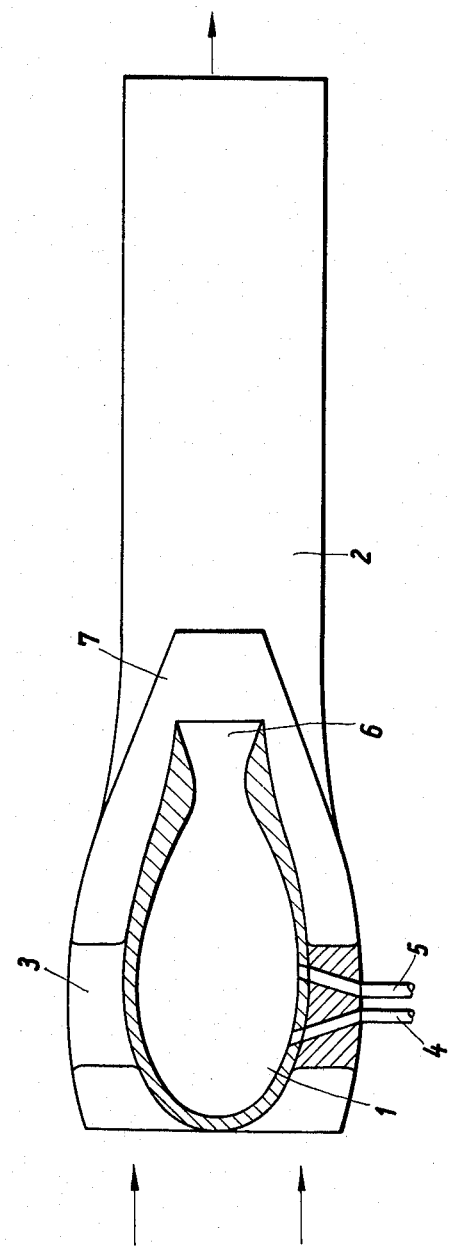

This invention relates to a water-and-gas-control means for a water-reaction motor. In a known method of powering vessels, wherein thrust force is produced by ejection of water through direct gas expansion, mechanical valves are generally provided as gas-water control members. There are proposed hereunder according to the invention controls for the filling of the chamber or reaction tube with water, which are designed without valves, i.e. without movable separate parts.

The invention is described in detail with reference to the accompanying drawing whose sole figure is a diagrammatic axial cross-sectional view of a reaction motor embodying the invention.

The combustion chamber 1 is arranged coaxially at the front end of the water conduit 2. The combustion chamber is provided with a Laval nozzle 6 and is retained in the water pipe 2 by means of appropriate ribs 3, through which the feed pipes for fuel 4 and oxygen 5 are guided. At the outlet of the Laval nozzle 6 of the combustion chamber there is disposed a throttle cone 7, which is rigidly connected to the water pipe 2 and is spaced at a suitable distance from the combustion chamber outlet. The mouth of the throttle cone is kept insofar as possible the same size as the mouth of the Laval nozzle. The water pipe 2 is filled in a known manner by way of the traction current, and the column of water accumulated in the pipe is ejected counter to the direction of travel by means of the fuel gases generated in the combustion chamber.

In absorbing the thrust or the reaction force, the gases bear on the outer casing of the throttle cone 7. At the end of the ejection process, the operation repeats itself, the maximum possible frequency depending on the sum of the filling and ejecting times.

We claim:
1. A hydraulic reaction engine comprising conduit means forming an elongated generally cylindrical duct with a continuously open outlet end for the expulsion of water through said duct and a continuously open inlet end for the introduction of water into said duct; housing means forming a combustion chamber at said inlet end communicating with said duct, said housing means forming a Laval nozzle within said duct open in the direction of said outlet end, said conduit means being formed with a conical throttling nozzle at said inlet end spaced from said Laval nozzle in the direction of said outlet end and converging in the direction of said outlet end while having a discharge aperture of a diameter less than that of said outlet end for admitting liquid to said duct between said nozzles and directing gases from said combustion chamber into said duct.

2. A reaction engine as defined in claim 1 wherein said discharge aperture of said throttling nozzle has a diameter at least substantially equal to the outlet diameter of said Laval nozzle.

References Cited by the Examiner
UNITED STATES PATENTS

| | | | |
|---|---|---|---|
| 2,412,825 | 12/1946 | McCollum | 115—13 X |
| 2,709,891 | 6/1955 | Dunbar et al. | 60—39.77 X |
| 2,943,440 | 7/1960 | Andras | 115—13 X |
| 2,971,325 | 2/1961 | Gongwer | 60—35.5 |
| 3,044,253 | 7/1962 | Zwicky | 60—35.5 |

FOREIGN PATENTS 589,726  6/1925  France.

MARK NEWMAN, *Primary Examiner.*

ABRAM BLUM, SAMUEL LEVINE, *Examiners.*